April 9, 1957 F. A. BOWERS 2,788,265
REFORMER FOR AMMONIA SYNTHESIS GAS
Filed Dec. 17, 1953

INVENTOR.
F. A. BOWERS
BY Hudson & Young
ATTORNEYS

United States Patent Office 2,788,265
Patented Apr. 9, 1957

2,788,265

REFORMER FOR AMMONIA SYNTHESIS GAS

Frederick A. Bowers, Cactus, Tex., assignor to Phillips Petroleum Company, a corporation of Delaware Application December 17, 1953, Serial No. 398,736

6 Claims. (Cl. 23—288)

This invention relates to an apparatus and a method for reforming gas. In one of its aspects, this invention relates to an apparatus for reforming natural gas so as to produce ammonia synthesis gas. In another of its aspects, this invention relates to an apparatus for producing a mixture of hydrogen and nitrogen in predetermined proportions by the reforming of hydrocarbon gases with water vapor and air. In still another aspect, this invention relates to a method of reforming a hydrocarbon gas to produce ammonia synthesis gas.

The art of reforming natural or hydrocarbon gas to produce an ammonia synthesis gas containing primarily hydrogen and nitrogen in a 3 to 1 ratio is old. The process consists essentially of purifying the hydrocarbon gas, reacting the gas with steam at elevated temperatures to form CO and $H_2$, burning part of the hydrogen so produced with air to form steam, and then reacting the CO with steam to form $CO_2$ and $H_2$. The following equations show these reactions:

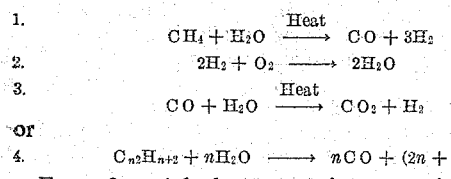

For a 3 to 1 hydrogen to nitrogen ratio, the net reaction may be represented by the following equation:

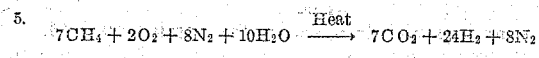

there will also be small amounts of inert gases introduced with the air ($2O_2+8N_2$).

I shall use $CH_4$ as the hydrocarbon in discussing this invention since $CH_4$ is the principal component in natural gas and natural gas is a relatively inexpensive source of hydrocarbons. It should be understood that this invention is applicable to other hydrocarbons as is illustrated by Equation 4 above.

The net reaction as shown by Equation 5 above does not go to completion there generally being CO and unreacted hydrocarbons in the product. In addition to the reaction products, there will also be some argon and helium gases which were introduced along with the air. The reactions of Equations 1 and 4 are promoted by means of a catalyst such as nickel oxide. Since hydrogen sulfide, generally found in natural gas, is a poison to the nickel oxide catalyst, the natural gas is passed through a sulfur removal vessel where the $H_2S$ is removed generally with an amine solvent and the final traces with zinc oxide.

As can be seen from Equation 5 above, ten mols of air are required for each 7 mols of methane and 10 mols of steam. The reactions according to Equations 1 and 3 require heat and are promoted by high temperature and a catalyst. The reaction illustrated by Equation 2 gives off heat. The preferred catalyst for Reactions 1 and 3 are different. For these reasons, it has been found necessary to carry out these reactions in several steps or to sacrifice some of the hydrocarbon gas.

In producing ammonia synthesis gas, generally the process is as follows: Steam is mixed with the gas and the mixture passed over a nickel oxide catalyst where the gas is converted to CO and $H_2$ and part of the resulting CO is converted to $CO_2$. Sufficient steam is used to convert the hydrocarbon and approximately half of the resulting CO. Heat is supplied to maintain the temperature in the range of 690–715° C. Under these conditions, the effluent gas will contain 2–3% unreacted hydrocarbon. Sufficient air is added to this effluent gas to supply the nitrogen needed in the ammonia synthesis gas. The oxygen from the air reacts with hydrogen and possibly some of the $CH_4$ in the effluent gas to form $H_2O$ and some CO and $CO_2$. Additional steam is added at this point to control the temperature in the range of 840–850° C. The resulting gas at this point contains the unreacted hydrocarbons, steam, hydrogen, nitrogen, carbon monoxide and carbon dioxide along with a small percentage of inerts. These gases, still in the temperature range of 840–850° C., are passed over a second bed of nickel oxide catalyst where most of the remaining unreacted hydrocarbon is coverted to CO and $H_2$. The effluent from this second catalyst bed is cooled to approximately 400–450° C., additional steam is added to supply a sufficient amount to react with the CO and these gases are passed over a CO oxidation catalyst such as $Fe_2O$, where the CO is reacted with the steam to form $CO_2$ and $H_2$. The $CO_2$ is removed in a $CO_2$ absorber leaving essentially hydrogen and nitrogen in a 3 to 1 ratio.

The apparatus used for carrying out the above process is of many types. Generally the steam and gas passes through a primary reform zone. In this zone, catalyst is supported in a multiplicity of parallel tubes to which an external source of heat is applied. The steam-gas mixture passes through the tubes over the catalyst. The effluent from this zone passes to a combustion zone where the necessary air is added and the oxygen of the air reacts with some of the combustible material (probably hydrogen) from the first zone. The gases resulting from the combustion are immediately cooled by the use of excess steam and the then resulting gases are passed to a second reform zone. This second reform zone is generally an elongated horizontal chamber having a bed of catalyst supported on a grid dividing the chamber into an upper and a lower section. The hot gases enter the upper section of the chamber at one end thereof and spread over the catalyst. The gases then pass through the catalyst and nearly all of the unreacted hydrocarbon from the first reform zone is converted in this secondary reform zone but generally leaving .3–.4 percent unconverted hydrocarbon. The hot gases then pass to a carbon monoxide converter where steam is added and the gases passed over a suitable catalyst to promote the reaction shown by Equation 3.

There are several disadvantages of the above system. First, the $CH_4$ is reacted with water to form $CO_2$, CO, and hydrogen. This requires an external source of heat. Later part of the hydrogen is burned giving off heat and the gases must be quenched with steam to control the heat. If $CH_4$ is oxidized to CO, $H_2$ and $H_2O$, then heat is given off. It would be desirable to utilize this heat and thus dimish the requirement for external heat. By the use of my invention, this source of heat is utilized. A second disadvantage of the conventional system where the catalyst in the secondary reform gas is supported in a bed is that it is very difficult to obtain a uniform temperature over the entire catalyst bed and to obtain a uniform flow of gases through the said bed. The gases will be hot (840–850° C.) at that end of the chamber where they enter, but will be cooler at the opposite end and can be as low as 780° C. Still another disadvantage of the conventional apparatus is that the tubes of the primary reformer unit are expensive to fabricate and maintain. Catalyst must be removed from time to time to be reactivated and it is difficult to remove this catalyst from the tubes. By the use of my invention, the gases are introduced and uniformly distributed over the entire catalyst bed surface.

I have found that when the gas containing 3–4 percent $CH_4$ from the first reaction zone (primary reform gas) passes through a 12 to 24 inch bed of nickel oxide catalyst at 800° C., the effluent gas will still contain about .7 percent $CH_4$. When this same gas passes through the same catalyst at 825° C., the effluent gas will contain only about .3 percent $CH_4$ and if the temperature of the gas is raised to 850° C., then the effluent gas will contain only about .1 percent $CH_4$. On the other hand, if the gas temperature is raised another 25° to 875° C., the effluent gas will contain about .08 percent $CH_4$ so that raising the temperature even higher gives very little advantage. When the temperature exceeds 900° C., then special high temperature construction is required. In an ammonia plant producing 400 tons of ammonia per day, a reduction from .3 percent to .1 percent unreacted methane means a savings of $100,000 per year. For these reasons, it is desirable to maintain a uniform temperature between 850–875° C. of the gases passing through the catalyst bed.

An object of this invention therefore, is to provide a method of reforming a hydrocarbon with steam and air to produce a gas suitable for ammonia synthesis wherein the heat of reaction resulting from burning the hydrocarbon is utilized in the hydrocarbon-steam reaction. Another object of this invention is to provide a suitable apparatus for efficiently reforming a hydrocarbon gas. Other objects and advantages of my invention will be obvious to those skilled in the art upon reading the following disclosure.

My invention can best be described by referring to the attached drawings which are made a part of this disclosure.

As was hereinbefore said, I shall describe my invention in terms of methane ($CH_4$). Since the net equation for all of the reactions is:

$$7CH_4 + 2O_2 + 8N_2 + 10H_2O \rightarrow 7CO_2 + 8N_2 + 24H_2$$

I will use 7 mol parts of $CH_4$ as the basis for the following discussion which is a description of a preferred embodiment of my invention. Heat will be expressed in calories and mols are gram mols.

Reactions involved are:

6. $5CH_4 + 7\frac{1}{2}H_2O \rightarrow 2\frac{1}{2}CO + 2\frac{1}{2}CO_2 + 17.5H_2 - 373,068$ cal.

7. $2CH_4 + 2O_2 + 8N_2 \rightarrow 2CO + 2H_2O + 2H_2 + 8N_2 + 173,608$ cal.

8. $4\frac{1}{2}CO + 4\frac{1}{2}H_2O \rightarrow 4\frac{1}{2}CO_2 + 4\frac{1}{2}H_2 - 47,875$ cal.

Figure 1:
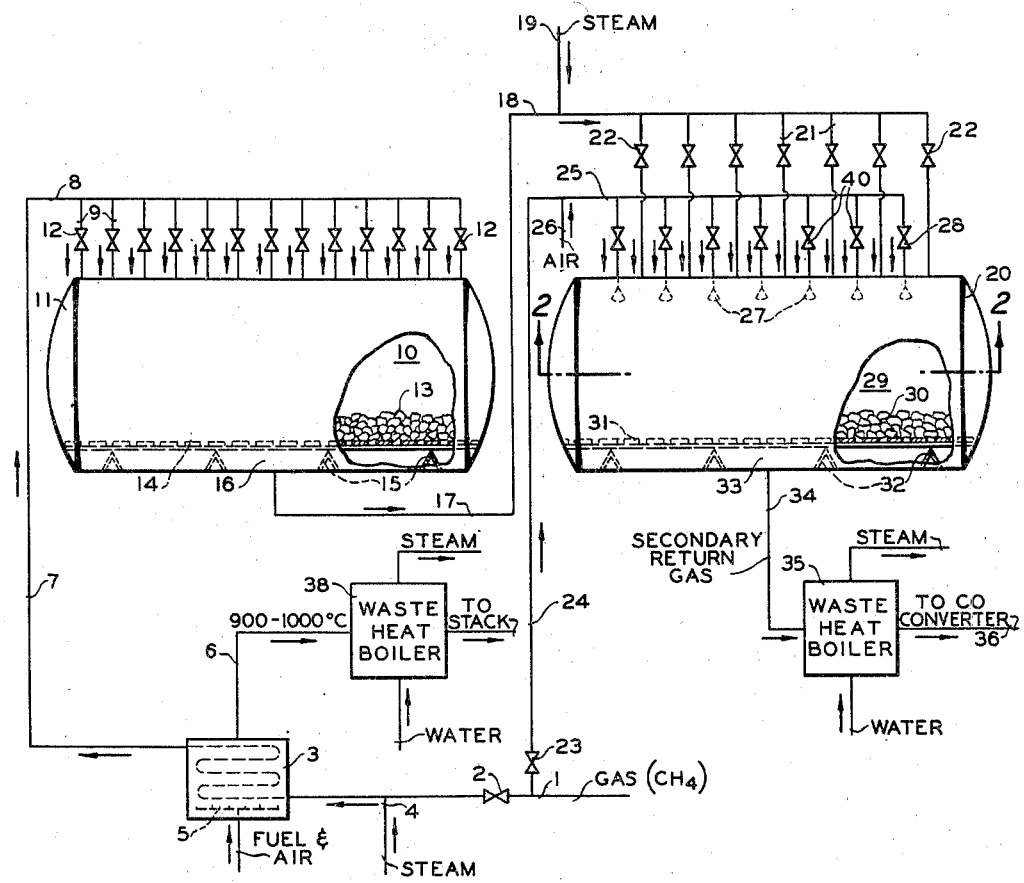
Figure 1 is a schematic representation of my invention and shows the catalyst with the burners disposed over the catalyst bed.

Referring to Figure 1, $CH_4$ (nature gas) from gas header 1 is fed via valve 2 to gas-steam preheater 3. For each 5 mols of $CH_4$ passing to the preheater, 7½ mols of steam are added and mixed with the $CH_4$, the steam being admitted by means of conduit 4. Fuel is burned by means of burners 5 in the preheater which in turn heats and mixed $CH_4$ and steam to 800–850° C. The hot gases of combustion from burners 5 leave the preheater via conduit 6 and pass through waste heat boiler 7 where steam, which can be used in the process, is generated. The hot gases (including steam) leaves the preheater 3 through conduit 7 and pass to the steam gas header 8. These hot gases pass through a plurality of conduits 9 to diffusion zone 10 of the primary reformer 11 at a pressure of approximately 35 p. s. i. g. (pounds per square inch gage). The flow of gases through the conduits 9 are maintained at substantially equal flow rates by means of valves 12, respectively. The plurality of conduits 9 are so disposed and arranged that the gases entering the reformer will be thoroughly diffused in zone 10. The entering ports of conduits 9 will generally be separated by a distance of 6 inches to 6 feet and preferably by a distance of 2 to 3 feet. These gas ports will generally be arranged as will later be described for the gas ports and burners in the secondary reformer and in connection with Figure 2. The distance from the inlet ports to the surface of the catalyst bed 13 will be sufficient to provide complete diffusion of the gases and will generally be greater than 3 feet and seldom over 10 feet. Any greater distance will generally not be required and would result in greater construction cost and provide for more heat loss surface. The hot gases from zone 10 will then be passed through a suitable catalyst 13, such as nickel oxide, where a reaction such as shown by Equation 6 takes place. That is, sufficient steam is added so that the $CH_4$ will react with steam according to Equation 1 and about one half of the resulting CO will react with steam according to Reaction 3. The size of the reformer 11 is dependent upon the amount of gas to be reformed. It is so designed that the space velocity of the gases passing through the catalyst will have a space velocity of 300 to 600 v./v./hr. (volumes of gas per volume of catalyst per hour). The catalyst bed has a depth of 12 inches to 24 inches or greater and preferably a depth between 15 and 18 inches. Sufficient catalyst is used to insure maximum reforming under the pressure and temperature conditions encountered. The nickel oxide catalyst is expensive and little or no additional reforming is obtained by using an excess amount of catalyst. The catalyst bed is supported on a grid 14 usually of cast iron construction, which is in turn supported by arches 15 at a spaced distance above the bottom of the reformer. The reformed gases, called primary reform gas, are collected in zone 16 of the reformer.

The primary reformer gases in zone 16 pass through conduit 17 to steam gas header 18. In order to insure a uniform pressure drop across the catalyst bed 13, the gases can be withdrawn through a plurality of conduits to conduit 17 instead of using a single conduit means as shown. Under the conditions specified, the gases in conduit 17 have a temperature in the range of 690–715° C. The primary reformer gases at this point contain in addition to the reaction products, about 3–4 percent unreacted $CH_4$.

Steam is added to the gases in the steam-gas header 18 via conduit 19, thereby lowering the temperature of the gases to a temperature in the range of 650–700° C. The gases from header 19 will pass to secondary reformer 20 via a plurality of conduits 21. Each of the said conduits is provided with a valve means 22 for regulating the flow of gas through its associated conduit.

For about each 5 mols of $CH_4$ going to the primary reform unit, 2 mols of $CH_4$ will pass from gas header 1 through valve 23 and conduit 24 to the air gas header conduit 25. Air is admitted to conduit 25 via conduit 26 at a mol rate of 2 mols of oxygen for each 2 mols of $CH_4$. The air-gas mixture passes from conduit 25 through a plurality of conduits 40 to gas burners 27 located in the secondary reformer 20. The flow of gas through each conduit 40 is regulated by means of valves 28. These burners are of the multiple orifice type and produce many small flames. The air-gas mixture burns in these burners according to Reaction 7. The reaction products of the gas burning mix with the gas-steam mixture in zone 29. The pressure in this zone is 1 to 3 p. s. i. g. (pounds per square inch gage). The burning of $CH_4$ supplies sufficient heat to raise the temperature in this zone to 800–900° C. and preferably from 850–875° C. That is, the $CH_4$ will burn giving off heat, and sufficient steam is admitted from conduit 19 to conduit 18 to maintain the temperature in zone 29 at the desired level. An alternative method of controlling the temperature is to lower the temperature of the gases in conduit 17 preferably by means of a waste heat boilers and using less steam in conduit 19. The temperature of the gases in conduit 17 can readily be regulated by adjusting the steam pressure in the waste heat boiler.

A bed of catalyst 30 (generally nickel oxide) is supported on a grid 31, the said grid being supported by arches 32, in the secondary reformer 20. The hot gases from zone 29 pass through the catalyst to zone 33 from which the reaction products are withdrawn through conduit 34. As in the case of the primary reformer, a plurality of conduits can be used here. Substantially all of the remaining $CH_4$ is reacted in this catalyst zone. The gases in conduit 34 are cooled in waste heat boiler 35 to 400–450° C. and are passed to a CO converter via conduit 36 where the CO is converted to $CO_2$ and $H_2$ according to Equation 3.

The catalyst bed 30 in the secondary reformer 20 will vary in depth between 12 and 24 inches and generally between 15–18 inches. A thicker bed can be used, however, this catalyst material is generally expensive and for that reason the volume is kept low. The distance from the surface of the catalyst bed to the burners 27 should be great enough to allow for complete mixing in zone 29 of the gases from the burners and the gases from the conduits 21. This distance will generally be in the range of 3–10 feet. The secondary reformer size will depend upon the total rate of gas consumption and will be so designed to provide for a gas space velocity over the catalyst of between 1500 and 4000 volumes of gas per volume of catalyst per hour (v./v./hr.).

Figure 2:
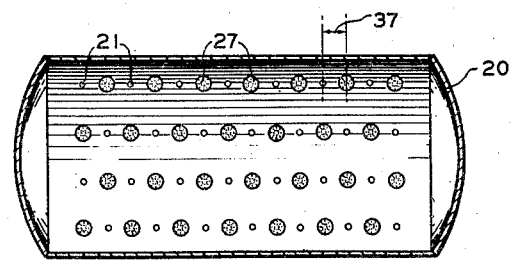
Figure 2 is taken along the 2—2 line of Figure 1 and shows a checker-board arrangement of the burners and the steam-reform gas mixture inlets.

Referring to Figure 2 which shows a typical checkerboard arrangement of the inlet conduits 21 and the gas burners 27, the distance 37 between adjacent conduits and burners is in the range of 6 inches and 6 feet and generally in the range of 2–3 feet. This same arrangement, with the exception of the burners, is also applicable to the gas inlets 9 in the primary reformer 11. Other arrangements can be used, the primary consideration being that the steam-gas and the burner combustion products be uniformally mixed and dispersed before passing through the catalyst bed.

I have described my invention in terms of methane. The usual source of hydrocarbon will be natural gas which contains other hydrocarbons and nitrogen along with the methane. The reactions would have to be adjusted accordingly as would the amount of air used. I have shown passing 5 mols of gas to the primary reformer and burning 2 mols of gas in the secondary reformer. Burning two mols of gas per two mols of air will supply sufficient heat to cause substantially all of the $CH_4$ from the primary reformer to react in this secondary reformer. On the other hand, more or less $CH_4$ can be burned by adjusting the gas and steam flow to the primary reformer. If more gas passes to the primary reformer, then more heat would have to be added. On the other hand, if more $CH_4$ passes to the burners, then there is danger of carbon deposition. In any case, only 2 mols of air can be used for each 7 mols of $CH_4$ used. If an excess of $CH_4$ is passed with air to the secondary reformer, the reaction will be in part as follows:

$$4CH_4 + 2O_2 \rightarrow 4CO + 8H_2$$

and $$4CH_4 + 2O_2 \rightarrow 4C + 4H_2O + 4H_2$$

On the other hand, if the $CH_4$ is small, the reaction will be:

$$CH_4 + 2O_2 \rightarrow CO_2 + 2H_2O$$

If the amount of $CH_4$ is very low, then the air would burn some $H_2$ in the effluent gas from the primary reformer.

The amount of steam mixed with the methane or natural gas to the primary reformer can be varied over a wide range. If less steam is used, then less CO will be oxidized to $CO_2$ and consequently more heat will have to be supplied. Also, if less steam is supplied, a higher percent of unreacted $CH_4$ will pass through this unit. If an excess amount of steam is added, it will pass through unreacted at the temperature and pressure conditions described. This excess steam would have to be heated by the external source of heat.

The steam can be supplied, at least in part, from waste heat boilers in the primary reformer stack conduit and in the secondary reformer effluent conduit. The conduit 19 can be connected with a plurality of conduits to zone 18 of the secondary reformer. The air for burning $CH_4$ can be supplied individually to each burner instead of being mixed with the methane. The gas can be divided by automatic means through valves 2 and 23.

The reactions which are encountered in my invention are well known in the art and it is within the scope of this invention to use any catalyst known to promote the desired reaction.

It is within the scope of my invention to use any of the known primary reformer vessels in conjunction with my secondary reformer. This might be desirable, for example, where such equipment is already installed. In such a case, many of the advantages of my invention can be obtained by modifying the secondary reformer in accordance with the teaching of this disclosure. This would insure substantially complete reforming of the methane and would allow for utilization of the heat of combustion of the $CH_4$.

In still another embodiment of my invention, steam is mixed with natural gas and the resulting mixture is preheated to 800–850° C. These hot gases are distributed over and passed through a catalyst bed wherein the gas-water reaction occurs. These gases can then pass through a second heating zone where the temperature level will be raised to 825–875° C. These hot gases are then dispersed over a second catalyst bed. At the same time, part or all of the air is burned with gas and the combustion products mixed with the said heated gases. These mixed gases are passed through a catalyst bed and are then again heated to 850–875° C. These last said hot gases are dispersed over a third catalyst bed. If all of the required air was not introduced and burned over the second catalyst bed, then the remaining required air is introduced and burned with gas at this point. The gases are mixed and passed through the third catalyst bed. The advantage of this embodiment is primarily that the unreacted $CH_4$ in the gas to the CO converter can be reduced to less than 0.5 percent.

In any of the above embodiments, it is within the scope of this invention to use a plurality of units similar to the secondary reformer as shown in Figure 1 with the necessary piping and valving arrangement to use any units for the desired purpose. An extra unit is provided so that one unit can always be down for repairs and catalyst reactivation. The unit being used as a primary reformer would have valves 28 of Figure 1 closed and the burners would not be in use in that unit. Such piping arrangements are within the skill of the art.

Those skilled in the art will see many other modifications which can be made without departing from the spirit and scope of this invention.

I claim:

1. In an improved apparatus for reforming a hydrocarbon gas, the improvement comprising, in combination, a reforming vessel having a laterally unobstructed upper and a laterally unobstructed lower zone; a steam gas header; a plurality of conduit means connecting the said steam-gas header with the said reforming vessel, the said conduit means entering the upper zone of the reforming vessel at a plurality of spaced positions which are so disposed as to promote uniform dispersion of a fluid passing through said conduits in the upper zone; a single laterally unobstructed catalyst bed supported in the said reforming vessel so as to separate the vessel into said upper and lower zones; and means for removing fluid from the lower zone of the said reforming vessel.

2. An improvement in a gas reforming apparatus said improvement comprising, in combination, a plurality of burners disposed in spaced relationship within the upper zone of a reaction vessel and at a predetermined distance above a single laterally unobstructed bed of catalyst supported in the said reaction vessel so that the reaction products of the said burners will be dispersed uniformly over the said catalyst bed, said bed separating said vessel into a laterally unobstructed upper zone and a laterally unobstructed lower zone; means for supplying gas and air to the said burner in a predetermined ratio; a plurality of means for supplying steam and gas to the said reaction vessel in a predetermined ratio, said last-mentioned means being disposed in a predetermined pattern among the said burners so as to promote uniform mixing of the said steam and gas with the reaction products of the said burners; and means for withdrawing the reacted gas from the said lower zone.

3. The improvement of claim 1 wherein the burners are disposed in spaced relationship at a distance apart within the range of 6 inches to 6 feet and wherein the predetermined distance above the bed of catalyst is not greater than 10 feet nor less than 3 feet.

4. An apparatus for reforming a hydrocarbon gas, the said apparatus comprising, in combination, a reaction vessel; a plurality of burners disposed in a predetermined manner throughout the top portion of the said vessel so that the reaction products of the said burners will be uniformly dispersed above the after said catalyst; a gas-air header; valved conduits respectively connecting each said burner with the said gas-air header; a steam-gas header; a plurality of valved conduits connecting the said steam-gas header with the reaction vessel, the inlets from said conduits being disposed among the said burners so that steam and gas supplied from the said steam-gas header will uniformly mix with the reaction products of the said burners; a grid supported at a spaced distance from the top of said vessel; a catalyst bed 12 to 24 inches thick supported on said grid, said grid and catalyst separating the reaction vessel into a laterally unobstructed upper section and a laterally unobstructed lower section; and conduit means from the section of the reaction vessel below the said grid.

5. An improved apparatus for reforming a hydrocarbon gas, the said apparatus comprising, in combination, a primary reform gas header; means of admitting steam to the said header; an air-gas header; a reaction vessel; a bed of catalyst having a thickness in the range of 12 to 24 inches supported on a grid; said grid and catalyst separating the reaction vessel into a laterally unobstructed upper chamber and a laterally unobstructed lower chamber; a plurality of burners disposed in the said upper chamber of the reaction vessel in a predetermined pattern so that the reaction products of the said burners will be dispersed uniformly over the surface of the said catalyst bed; a plurality of valved conduits connecting the air-gas header with the plurality of burners respectively; a plurality of valved conduits connecting the primary reform gas header and the reaction vessel, the inlets of the last said conduits being disposed in a predetermined pattern among the said burners so that the reaction products of the said burners will mix with the gas from the said primary reform gas conduits and the said inlets and the said burners being disposed at a spaced distance above the said catalyst so that complete mixing of the gases will be obtained in said upper chamber above the catalyst bed; and conduit means for removing fluids from the said lower chamber of the reaction vessel.

6. An improved apparatus for reforming a hydrocarbon gas, the said apparatus comprising, in combination, a hydrocarbon gas header; two conduits each having its inlet connected to the said hydrocarbon header; means for dividing gas from the said header to the two conduits in predetermined proportions; a conduit means for adding steam to one of the aforesaid conduits, this conduit having its outlet connected to the inlet of a reform vessel, the said reform vessel containing a catalyst and means for passing steam and gas from the last said conduit over the catalyst; means for maintaining the desired temperature of the said gases passing over the said catalyst; a steam-gas header; conduit means connecting the outlet of the said reform vessel to the inlet of the said steam-gas header; conduit means for admitting steam to the said steam-gas header; an air-gas header; the outlet of the second said conduit connected to the said air-gas header; conduit means for admitting air to the said air-gas header; a reaction vessel; a grid separating the reaction vessel into an upper and lower chamber; a bed of catalyst having a thickness in the range of 12 to 24 inches supported on the said grid; a plurality of burners disposed in the said upper chamber of the reaction vessel in a predetermined pattern so that the reaction products of the said burners will be dispersed uniformly over the surface of the said catalyst bed; a plurality of valved conduits connecting the air-gas header with the plurality of burners respectively; a plurality of valved conduits connecting the primary reform gas header and the reaction vessel, the inlets of the last said conduits being disposed in a predetermined pattern among the said burners so that the reaction products of the said burners will mix with the gas from the said primary reform gas conduits and the said inlets and the said burners being disposed at a spaced distance above the said catalyst so that complete mixing of the gases will be obtained in the section of the chamber above the catalyst bed; and conduit means for removing fluids from the said lower chamber of the reaction vessel.

References Cited in the file of this patent

UNITED STATES PATENTS

| 1,874,801 | Porter | Aug. 30, 1932 |
|---|---|---|
| 1,904,908 | Voorhees | Apr. 18, 1933 |
| 1,931,442 | Klempt | Oct. 17, 1933 |
| 1,958,201 | Nagel | May 8, 1934 |
| 2,178,833 | Erasmus | Nov. 7, 1939 |
| 2,339,882 | Savage | Jan. 25, 1944 |
| 2,381,696 | Shapleigh | Aug. 7, 1945 |
| 2,483,494 | Kleiber et al. | Oct. 4, 1949 |
| 2,578,490 | Shapleigh | Dec. 11, 1951 |
| 2,610,106 | Gray | Sept. 9, 1952 |